May 15, 1934.     R. E. MARBURY ET AL     1,958,900
KITCHEN POWER UNIT
Filed Sept. 29, 1931     3 Sheets-Sheet 1
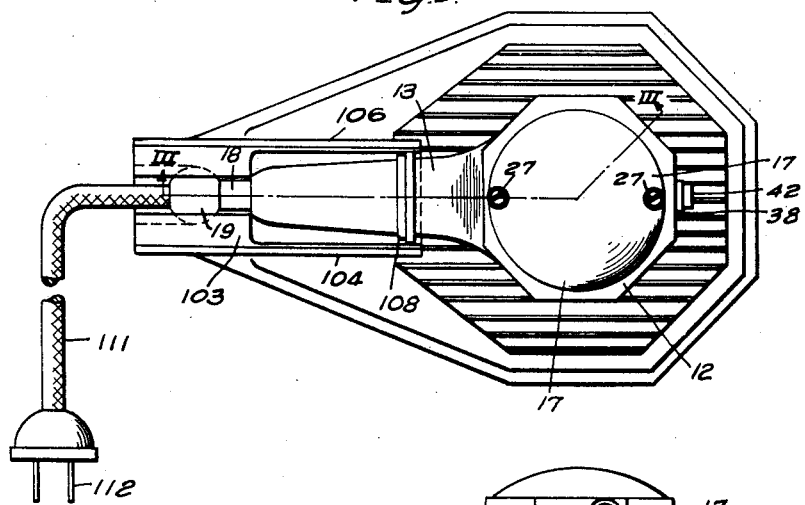
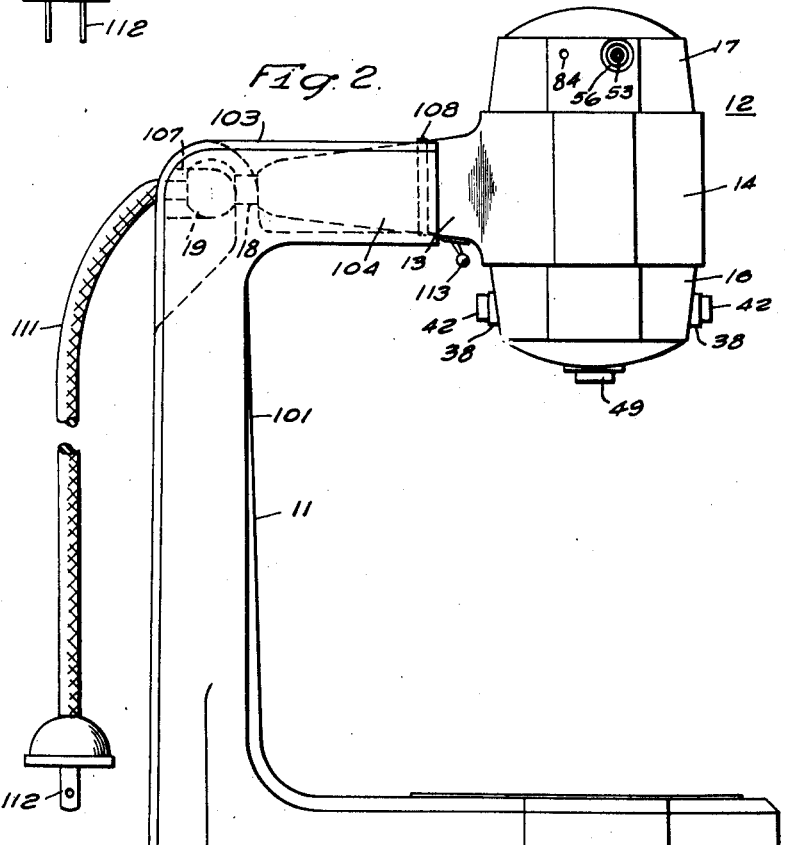
INVENTORS.
Rolph E. Marbury
and Hugh G. Ross.

May 15, 1934.    R. E. MARBURY ET AL    1,958,900
KITCHEN POWER UNIT
Filed Sept. 29, 1931    3 Sheets-Sheet 2
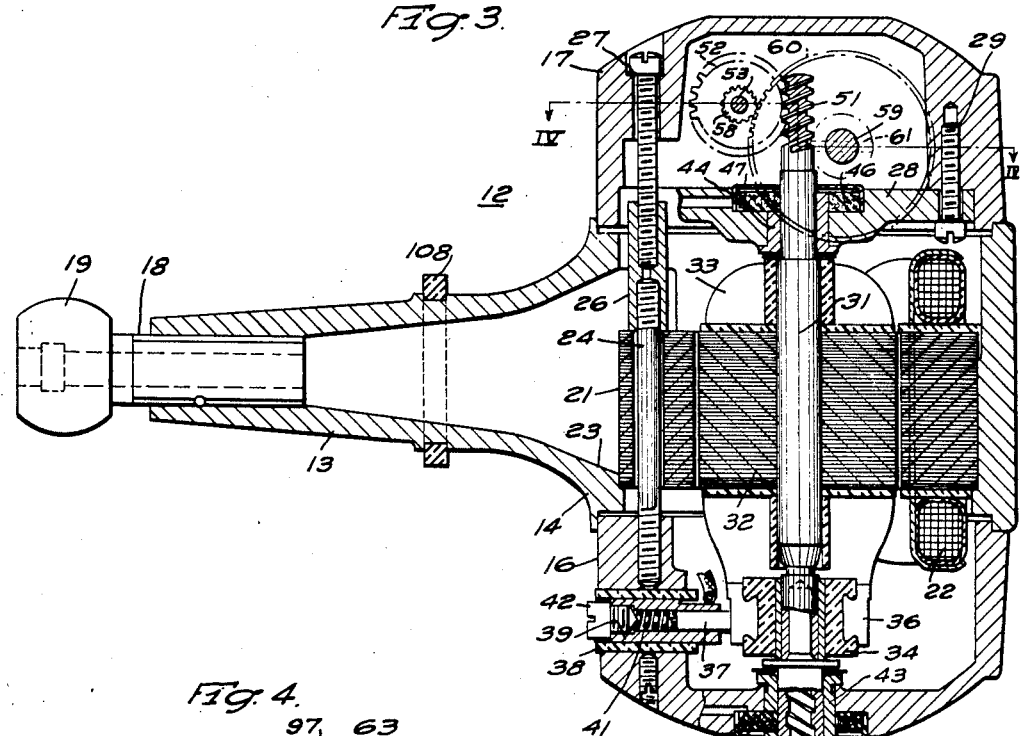
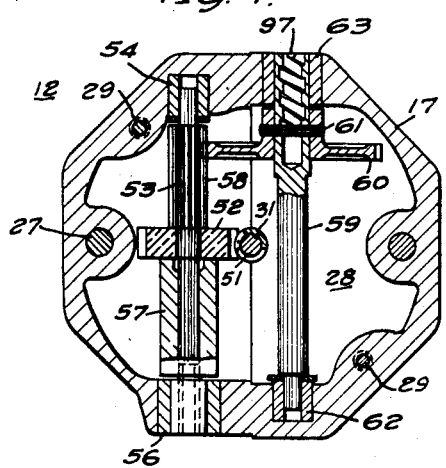
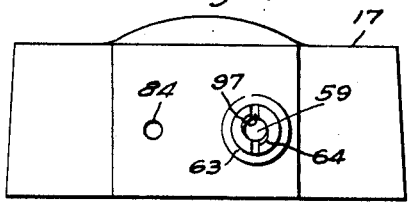
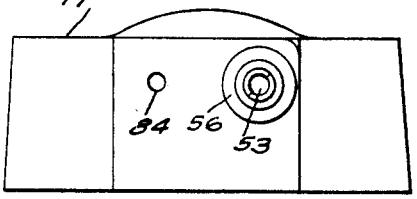
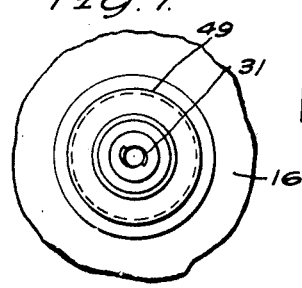
WITNESSES.
E. A. M?Closkey.
N. M. Biebel
INVENTORS.
Ralph E. Marbury
and Hugh G. Ross.
BY W. R. Coley
ATTORNEY May 15, 1934.  R. E. MARBURY ET AL  1,958,900
KITCHEN POWER UNIT
Filed Sept. 29, 1931   3 Sheets-Sheet 3
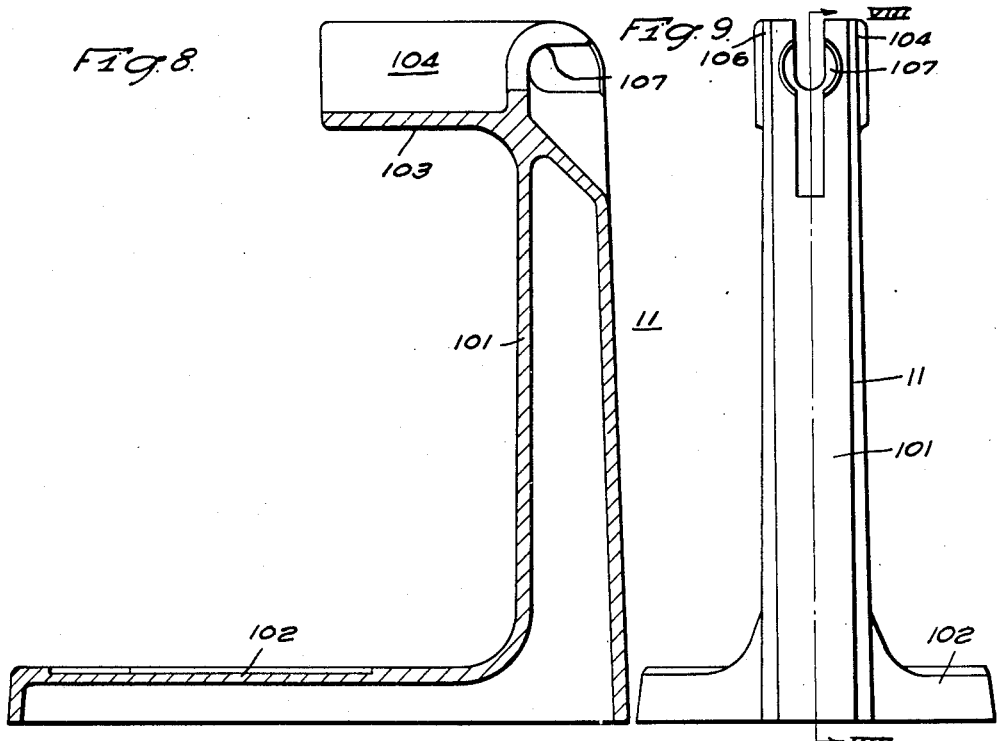
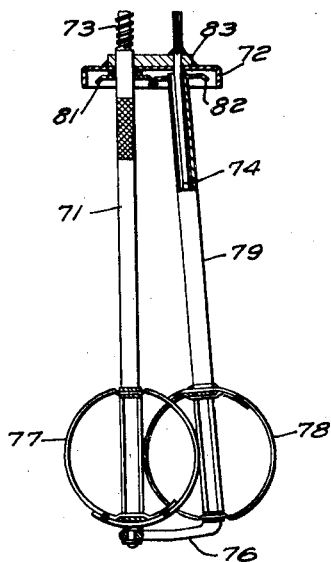
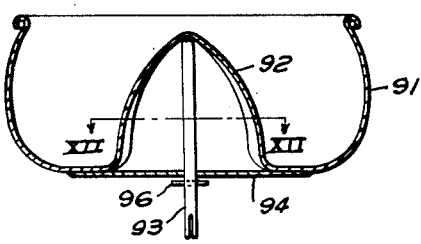
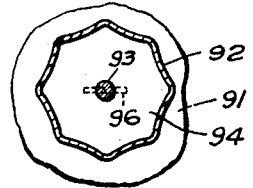
INVENTORS.
Ralph E. Marbury
and Hugh G. Ross.
BY
ATTORNEY Patented May 15, 1934

1,958,900

UNITED STATES PATENT OFFICE 1,958,900

KITCHEN POWER UNIT

Ralph E. Marbury, Wilkins Township, Allegheny County, and Hugh G. Ross, Wilkinsburg, Pa., assignors to Westinghouse Electric and Manufacturing Company, a corporation of Pennsylvania Application September 29, 1931, Serial No. 565,728

7 Claims. (Cl. 172—36)

Our invention relates to motor-driven devices and particularly to motor-driven kitchen appliances.

An object of our invention is to provide a relatively simple and easily handled motor-driven household device that shall be capable of selective utilization for a number of different operations in the preparation of food.

Another object of our invention is to provide a motor-driven kitchen utensil that shall be selectively mountable on a support in a number of different positions thereon, and that shall be usable when removed from the support and held by an operator.

In practicing our invention, we provide a motor housing of substantially T-shape, the stem portion thereof constituting a handle and having a ball at its end to fit into a socket in a support and be quickly and easily removable therefrom. A motor located in the main part of the housing actuates simultaneously, and at different speeds, a plurality of shafts extending in different directions and selectively engageable by various driven appliances.

In the drawings,

Figure 1 is a top plan view of a device embodying our invention;

Fig. 2 is an enlarged view in side elevation thereof;

Fig. 3 is a view in longitudinal section therethrough, taken on the line III—III of Fig. 1;

Fig. 4 is a view in lateral section through one end of the motor housing, taken on the line IV—IV of Fig. 3;

Fig. 5 is a partial view of one end of the motor housing illustrating one driving shaft;

Fig. 6 is a similar view of the same end of the motor housing illustrating a different driving shaft;

Fig. 7 is an end view of the main part of the housing;

Fig. 8 is a view in vertical section through a support, taken on the line VIII—VIII of Fig. 9;

Fig. 9 is a rear end view of the support shown in Fig. 8;

Fig. 10 is a view in side elevation of a beater device to be used with the device more particularly embodying our invention;

Fig. 11 is a view in radial section through a fruit reamer or fruit juice extracting means, and Fig. 12 is a section through a part of this device, taken on the line XII—XII of Fig. 11.

It is one of the objects of our invention to provide a relatively light motor-driven kitchen utensil that shall be particularly useful in the lighter mechanical operations connected with the preparation of certain kinds of food and, inasmuch as it is desirable to have one device so designed as to effect a number of different operations and to be located in either a fixed position on a base or be operable while held in the hand of an operator, we provide a support 11 and a motor housing 12 which latter may be operated when associated with the support or which may be operated when disassociated therefrom.

The housing 12 is of substantially T-shape and includes a stem portion 13, which is of such size as to be held in the hand of an operator, a central portion 14 for receiving therewithin a motor structure and a pair of end bells or casings 16 and 17, as may be seen more particularly in Fig. 3 of the drawings. It may be here noted that the stem portion 13 is hollow and that a tubular member 18 extends into the same at the outer end thereof, the tubular member 18 having a ball 19 at its outer end for a purpose to be hereinafter set forth.

A motor structure located within the casing portion 14 includes a laminated stator structure 21, having a plurality of stator energizing coils 22 thereon in a manner well known in the art. The stator structure may be held in the casing portion 14 as by being fitted against a shoulder portion 23, studs 24, having screw threads at each end thereof, extending through openings in the laminations of the stator, one end of each of the studs 24 fitting into, and having screw-threaded engagement with, the inner edge portion of end bell 16. Elongated nuts 26 engage the outer ends of the studs 24, and a tightening of the studs 24 in the member 16, and of the nuts 26 on the other end of the studs, will effect a tight clamping of the stator in casing 14 and of the end bell 16 thereagainst.

The end bell or gear box 17 is held in its proper operative position by a plurality of machine screws 27, the inner screw-threaded ends of which fit into the elongated nuts 26. A bearing bracket or disc 28 has interfitting engagement with the open end of end bell 17, and may be held therein by a plurality of machine screws 29.

A rotor includes a shaft 31, having laminations 32 thereon and a winding, indicated generally only at 33, and, if it is desired to provide a so-called universal motor, the armature winding may be such as may be connected to a suitable commutator, including a center 34 and a plurality of segments 36 supported thereby, all in a manner well known in the art. A plurality of commutator brushes 37 are provided, only one of which is shown in the drawings, and I have illustrated one form of brush-holder structure as including a bushing 38 of electric-insulating material, having a tubular brush holder 39 therein, for receiving and guiding the brush 37, a spring 41 and a short machine screw 42, fitting into the member 39 to yieldingly press the brushes against the commutator. While we have shown a rotor including a commutator, we do not desire to be limited thereto, nor do we desire to be limited to the particular brush holder and brush construction as these are shown more particularly for illustrative purposes, and similar and equivalent structures may be used.

The end bell 16 is provided with a bearing shell 43 therein for receiving one end of shaft 31, while a bearing shell 44 is provided in bearing bracket 28 for supporting the other end of shaft 31. Oil or grease retaining means may be provided in disc 28, and may include a piece of felt 46 and a thin metal cap 47, a substantially similar felt washer 48 and a protecting metal cover 49, being provided in operative relation to bearing shell 43.

One of the important elements of our invention lies in the provision of a plurality of continuously operating driving shafts extending through end bell 17 in different directions, and operating at a speed less than that of shaft 31. For this purpose, that end of shaft 31 located in end bell 17 is provided with worm threads 51 meshing with a worm gear 52, which worm gear is located on an auxiliary shaft 53 which is suitably mounted in, and supported by, bearing shells 54 and 56 (see Fig. 4), that end of shaft 53 located in bearing 56 extending to the outer surface of housing portion or end bell 17. A tubular spacing member 57 is provided on one end of shaft 53 between bearing shell 56 and worm gear 52, and the other portion of shaft 53 is provided with a plurality of teeth 58 (see Fig. 4) to constitute a pinion.

The second auxiliary shaft 59 is driven at a still lower speed by means of a spur gear wheel 60 which may be held in place on shaft 59 by a pin 61 and which meshes with teeth 58 on shaft 53. The shaft 59 is rotatably supported by bearing shells 62 and 63. That end of shaft 59 supported by shell 63, extends to the outer surface of end bell 17. This, of course, is for the purpose of permitting operative engagement of shaft 59 with some driven means, such as a beater or an agitator.

The end of shaft 31, located in bearing shell 43 and extending a small distance beyond housing 16, is provided with an internal screw thread 64, as is shown more particularly in Fig. 3 of the drawings, and, if desired, this screw thread may be made double pitch.

Referring to Fig. 10 of the drawings, we have there illustrated a preferred form of beater, including a main shaft 71 having one end thereof located in a support 72 extending therethrough and rotatable therein, the end portion having a screw thread 73 thereon. A second shaft 74, which is preferably made of lesser diameter than shaft 71, is rigidly supported in member 72, and its lower end may have a laterally extending portion 76 securable to the lower end of member 71 in such manner as to permit rotation of shaft 71. A pair of beater rings 77 and 78 are provided, ring 77 being mounted on member 71, while ring 78 is mounted on a tubular member 79 surrounding shaft 74. A pair of bevel gears 81 and 82 are mounted, respectively, on the upper end of shaft 71 and of tubular member 79, in such manner as to be protected by member 72, which may be made of dish shape for this purpose and be provided with a reinforcing block 83 to insure sufficient rigidity thereof.

Each one of the shafts 53 and 59 may be provided with a longitudinally extending opening in that end thereof which extends to the surface of portion 17, and screw threads may be provided in these openings to engage with the screw threads 73 on member 71, the direction of these respective threads being such that the driving engagement therebetween will cause them to remain in threaded engagement.

An auxiliary means for insuring a better support of the beater, shown in Fig. 10 of the drawings, or any similar device is provided by locating an opening 84 in end bell 17 adjacent to the outer ends of shafts 53 and 59 so that the end of shaft 74 may fit closely therein and assist in holding the beater in proper operative position.

We have illustrated, in Figs. 11 and 12 of the drawings, a reamer such as may be used in obtaining orange or lemon juice. This device includes a member 91 of cup-shape, having an internal upwardly-extending reamer portion 92, which is of substantially the contour shown in Fig. 12 of the drawings. A shaft 93 of relatively short length is secured to the reamer portion 92 and to a plate 94, the peripheral portion of which is suitably secured to the bottom of member 91, as by soldering or brazing.

A device of this kind should not operate at relatively high speeds, and we provide means whereby operative driving engagement of member or appliance 91 with the high speed shaft is effectively prevented. For this purpose, we provide a short laterally-extending pin 96 in shaft 93, located closely adjacent to member 94 and, as may be seen, by reference to Fig. 5 of the drawings, we provide the slow speed shaft 59 with a lateral slot 97 therein, it being understood that the location of housing portion 17 will be such that member 91 is in a vertical upright position thereon when it is desired to operate it. It is to be understood, of course, that shaft 93 is of such diameter as to fit snugly, but easily removable, in the longitudinal opening in shaft 59. As none of the other driving shaft ends are provided with the lateral slot 97, it is impossible to obtain an effective driving connection between shaft 93 and the other driving shafts, thus precluding operation of the reamer at high speeds which might be dangerous to an operator.

While we have illustrated two driven devices only, it is obvious that a number of other driven devices or agitators may be actuated by the motor, and in case of some of these operations, it is desirable to have the motor housing in a fixed position. To this end, we provide the base 11 which includes a vertical standard 101, a bottom portion 102 adapted to rest upon a support and an upper horizontally-extending portion 103. Figs. 8 and 9 show the general design of the support, and particularly of the upper portion thereof which, as may be seen, is of substantially inverted L-shape, the portion 103 including two side walls 104 and 106, and a socket 107 into which the ball 19, on stem 13, is adapted to fit. It may be here pointed out that we prefer to make the stem portion 13 of substantially rectangular shape in lateral section, so that it can fit into the space between walls 104 and 106, and a peripherally-extending resilient bumper 108 may be provided in order to cushion the motor in its support. It may here be further pointed out that the socket 107 in the support provides an over-hanging upper wall so that the weight of the motor structure, using the bumper 108 as a fulcrum, will ensure a close fit of the ball 19 in the socket 107. Thus, if it is desired to operate an agitator (not shown) at the rotor speed as by engagement with shaft 31, the motor housing 12 may have the ball 19 fitted into the socket 107, with the main part of the motor housing held above the level of the socket after which it may be dropped into the position shown in Fig. 2 of the drawings, when the weight of the over-hanging portion of the housing, and of the motor structure contained therein, will hold it in close operative engagement with the support.

If it is desired to drive a beater or mixer at a slower speed, it is only necessary to raise the motor housing, and it may here be noted that we have found it possible to make this structure of a size which can be conveniently and easily held in the hand of an operator, so that the handle portion 13 extends diagonally upwardly, relatively to portion 103, but with the ball remaining in the socket, whereupon the housing can be turned to cause either shaft 53 or shaft 59 to extend vertically downwardly and then to again drop the handle portion 13 into the recess between walls 104 and 106. Any desired mixing, beating or other implement may then be engaged with the proper shaft and the desired operation may be effected. It is to be noted that, while shaft 53 extends downwardly as to its operating end, the operating end of the other shaft 59 extends vertically upwardly.

Means for energizing the motor and for controlling its energization include a twin-cord supply conductor 111 of suitable length, having a usual terminal plug 112 connected thereto at its outer end, and a switch located in the handle portion 13 having an actuating arm 113 extending outwardly therethrough to be manipulated by the finger of an operator. It may be noted that member 18 is made tubular and that an opening is provided through ball 19 to permit the cord 111 to extend through the opening in these members so that the turning movements of the motor housing hereinbefore described may be effected without kinking of the supply circuit conductor.

If it is desired to use the motor housing 12 separate from the support, as by being held in the hand of an operator during its use, this can be done as the entire device is relatively small and, therefore, light enough to be held by an operator, and the weight of the motor and its housing is sufficient to steady the same against undesirably large movements of oscillations thereof, because of the reactive forces generated during use thereof. In order to remove the device 12 from the support, it is only necessary to raise the end portion in which the motor is mounted, to a position in which the handle portion 13 is substantially vertical after which the ball 19 can be slipped out of the socket 107, and the device can then be manipulated easily, control of the energizing circuit being had by manipulation of switch lever 113 by the index finger of the operator.

We wish to point out particularly that all of the driven shafts are operative at any one time, and that the amount of power available at the different shafts is substantially the same; i. e., the shaft having a lower operating speed has a higher driving torque. This is of great importance in certain operations which can be effected by the use of our improved appliance, for, while only a relatively small amount of torque may be necessary to drive the beater shown in Fig. 10, it is obvious that a greater amount of torque will be necessary when the device shown in Fig. 11 is used, and if a dough-mixing appliance is connected to the slow speed shaft 59, it is obvious that a still greater torque will be necessary because of the character of work being done.

Our device provides also means for precluding the engagement of a driven appliance with the wrong shaft; i. e., a shaft which might drive the appliance at a prohibitively high speed, which might cause bodily harm to the hand of an operator.

The device embodying our invention thus provides a relatively light and easily manipulated motor-driven appliance, including a motor housing of substantially T-shape, the stem of the housing constituting a handle and being of such size as to be held in the hand of an operator, a plurality of continuously-operating shafts driven at different speeds and means selectively engageable therewith, with the motor housing selectively mountable in a plurality of different positions on a support with which it has a swivelling connection to present a predetermined shaft in driving relation to the support. The motor housing may also be easily and quickly removed from the support and be held in the hand of the operator, if so desired.

Various modifications may be made in our invention without departing from the spirit and scope thereof, and we desire, therefore, that only such limitations shall be placed thereon as are imposed by the prior art or are set forth in the appended claims.

We claim as our invention:

1. A motor-driven device including a supporting member of substantially inverted L-shape having a socket at one end and a recess at the other end of the horizontally-extending leg, a motor housing having a handle portion, a ball at the outer end of the handle portion adapted to fit in the socket, an intermediate part of the handle portion fitting into the recess, and a motor in the housing, said motor and housing over-hanging the recessed support to lock the motor driven device in the supporting member.

2. A motor-driven device including a horizontal supporting member having a socket at one end and a recess, of predetermined shape in lateral section, at the other end of the supporting member, a motor housing having an enlarged end with a motor therein and a handle portion of reduced size relatively to the motor-containing end of the housing and of a shape in lateral section to interfit with the recess, a ball at the outer end of the handle portion adapted to fit in the socket, whereby the weight of the over-hanging motor housing and the motor therein tends to maintain the motor driven device in operative position in the supporting member.

3. A motor-driven device including a supporting member having a socket and a recess therein, a motor housing having a handle portion, a motor winding in the housing, a ball in the outer end of the handle portion having an axial opening therethrough, adapted to be located in the socket and turn therein, and current supply leads for the motor winding extending into the housing through the opening in the ball member.

4. A motor-driven device including a supporting member having a socket and an upwardly open recess located in spaced relation thereon, a motor housing structure including a motor housing having a handle portion and a motor-receiving portion at one end of the handle portion, a motor assembly in the motor-receiving portion, and a ball at the other end of the handle portion, the ball being adapted to fit removably in the socket and an intermediate part of the handle being adapted to simultaneously fit into the recess in the support with the motor-receiving portion over-hanging the support to hold the motor housing structure in proper operative position on the supporting member.

5. A motor-driven device including a motor-housing structure, of substantially T-shape, the stem portion of the structure constituting a handle, a ball at the end of the stem, a support for the motor housing structure having a socket for receiving the ball and a recess for receiving a part of the handle, and a resilient band around the handle and interlocked therewith and interfitting with the wall of the recess to preclude relative movement of the motor-housing structure relatively to the support in one direction.

6. A motor-driven device including a support having a socket therein, a motor housing having a motor winding therein, a ball at one end of the motor housing fitting and turnable in the socket relatively to the support and current supply leads for the motor winding extending into the motor housing through the ball.

7. A motor-driven device including a motor housing, a driven shaft in the housing extending therethrough, a driven appliance having a shaft adapted to engage the driving shaft, and a projection on the driven appliance fitting into an opening in the housing to steady the driven appliance during its operation.

RALPH E. MARBURY.
HUGH G. ROSS.